(12) United States Patent
Ludwig et al.

(10) Patent No.: US 6,513,942 B2
(45) Date of Patent: Feb. 4, 2003

(54) LUMINAIRE

(75) Inventors: Alexander Ludwig, Heinrichshofen (DE); Rudolf Rieger, Mering (DE); Tibor Csizy, Mering (DE)

(73) Assignee: Gebrüder Ludwig GmbH (DE)

( * ) Notice: Subject to any disclaimer, the term of this patent is extended or adjusted under 35 U.S.C. 154(b) by 0 days.

(21) Appl. No.: 09/726,711

(22) Filed: Nov. 30, 2000

(65) Prior Publication Data

US 2001/0002164 A1 May 31, 2001

(30) Foreign Application Priority Data

Nov. 30, 1999 (DE) .......................... 199 57 584

(51) Int. Cl.[7] ................................ F21V 8/00
(52) U.S. Cl. ................... 362/31; 362/328; 362/331; 385/901
(58) Field of Search ................ 385/146, 131, 385/901; 362/31, 326, 327, 328, 331, 332

(56) References Cited

U.S. PATENT DOCUMENTS 5,396,350 A   3/1995  Beeson et al. ............... 359/40
5,420,761 A * 5/1995  DuNah et al. ................ 362/31
5,555,329 A   9/1996  Kuper et al. .................. 385/36
5,961,198 A  10/1999  Hira et al.

FOREIGN PATENT DOCUMENTS

| DE | 4237107 | 5/1994 |
| DE | 4301339 | 7/1994 |
| DE | 4339274 | 5/1995 |
| DE | 4342338 | 6/1995 |
| EP | 0495273 | 7/1992 |
| WO | 9423244 | 10/1994 |
| WO | 9726584 | 7/1997 |

* cited by examiner

*Primary Examiner*—Sandra O'Shea
*Assistant Examiner*—John Anthony Ward
(74) *Attorney, Agent, or Firm*—Ostrolenk, Faber, Gerb & Soffen, LLP (57) ABSTRACT

Luminaire having an optical waveguide plate, which has a first light guiding surface, and having a light reflecting area—arranged opposite the latter—of an opaque reflector, which reflects light back into the optical waveguide plate in such a way that at least part of said light emerges from the second light guiding surface facing away therefrom. The light reflecting area has a very large number of reflecting area regions, which extend obliquely with respect to one another and obliquely with respect to the opposite first light guiding surface of the optical waveguide plate.

18 Claims, 6 Drawing Sheets

LUMINAIRE

BACKGROUND OF THE INVENTION

The invention relates to a luminaire with light guiding surfaces.

The term "luminaire" means an apparatus designed such that it can emit light generated by a light source, e.g. a fluorescent tube or an incandescent bulb, essentially without glare.

In a preferred embodiment, light is emitted without glare "directly" into the room to be illuminated or at a location to be illuminated.

However, with the luminaire according to the invention, light from the light source can be emitted "indirectly" into the room to be illuminated or at the location to be illuminated by the light being radiated toward a ceiling or a wall of the room. From there, it is reflected into the room to be illuminated or at the location to be illuminated.

The embodiments of the invention which are illustrated herein are designed such that they emit "direct" light downward and "indirect" light upward.

For generating light without glare, EP 0495273 B1 discloses a flat luminaire having a transparent plate. The plate has a flat top side and a top side provided with prism-like ribs. The light passes through the plate and through the prism regions thereof. It is multiply refracted in the prism regions in the process.

U.S. Pat. No. 5,555,329 discloses a light guiding structure having an optical waveguide plate. Prism blocks are either formed or placed on a surface of the optical waveguide plate, so that light can penetrate the prism block from the optical waveguide plate and then, after repeated light refraction, can emerge from the prism block into the external surroundings.

Similar luminaires, specifically for background lighting, are also shown by U.S. Pat. No. 5,396,350 and WO 97/26584, DE 43 42 338 A1, DE 43 01 339 A1, DE 43 39 274 A1.

SUMMARY OF THE INVENTION

The invention is intended to achieve the object of providing a luminaire for light without glare which acts similarly to the known luminaires having prism blocks but which can be produced significantly more cost-effectively, structurally more simply and with a smaller structural height.

This object is achieved according to the invention by the luminaire having an optical waveguide, with opposite light guiding surfaces, a transverse light introducing area; a first reflecting area comprised of obliquely arranged reflecting areas reflecting light back through the waveguide through the other surface along with non-reflected light which passes through the waveguide. Glare is essentially avoided.

BRIEF DESCRIPTION OF THE DRAWINGS

The invention is described below with reference to the drawings using preferred embodiments as examples. In the drawings.

DESCRIPTION OF PREFERRED EMBODIMENTS

Figure 1:
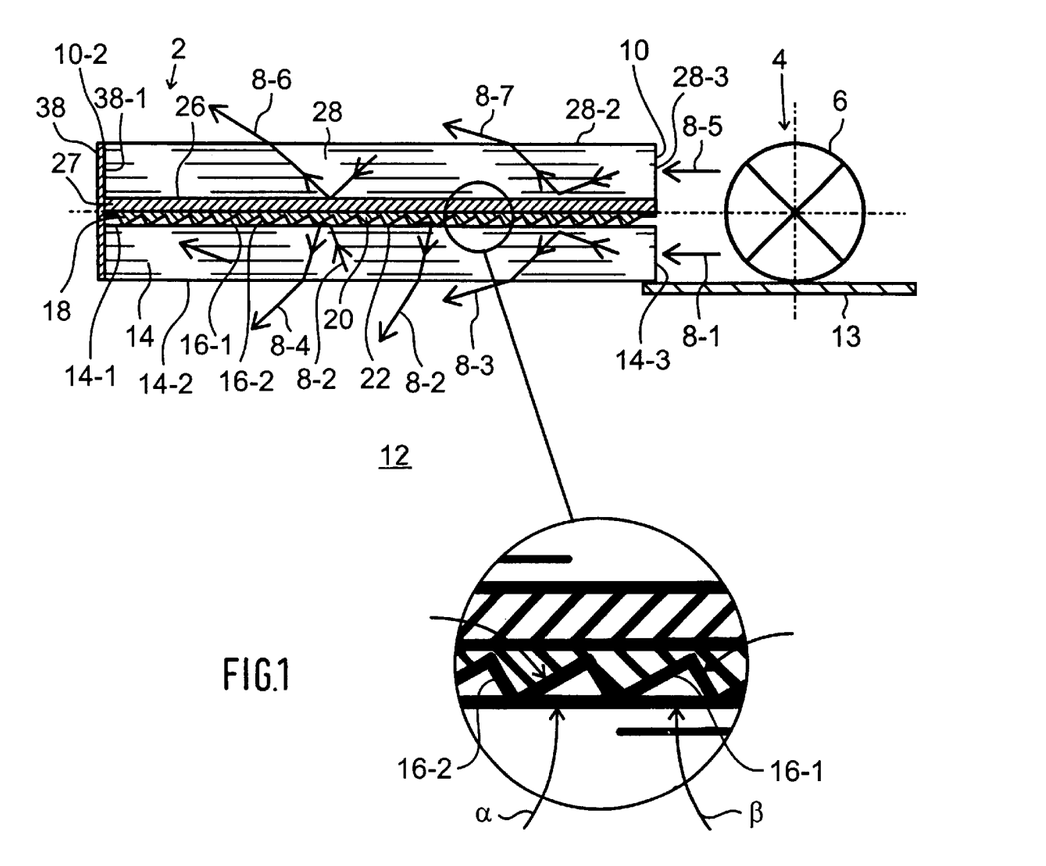
FIGS. 1 to 6 are respective schematic side views of six different embodiments of luminaires according to the invention, FIG. 7 schematically shows a bottom view of a further embodiment of a luminaire according to the invention.

FIG. 1 shows a luminaire according to the invention including a luminaire unit 2, having a length and a width which are significantly greater than its thickness measured in the height direction. Situated to the right, next to the luminaire unit 2, is a light source position 4 for receiving a light source 6, e.g., a fluorescent tube, an incandescent bulb or another known type. As a result, light 8 from the source passes to an end 10—situated opposite it—of the luminaire unit 2.

Below, the light source 6 is shielded, by an opaque element 13, from the room region 12 that it is to be directly illuminated. Light emitted from the light source 6 upward or in the direction opposite the luminaire unit 2 can be shielded by a similar element or can be directed toward a ceiling or a wall of a room, from where it may be reflected as indirect light into the room region 12 to be illuminated.

The luminaire unit 2 contains a first optical waveguide plate 14, which has an upper, first light guiding surface 14-1 and a lower, second light guiding surface 14-2 for guiding a light portion 8-1 from the light source 6 from a light introducing area 14-3 at the end through the optical waveguide 14. The light introducing area 14-3 is situated on that end 10 of the luminaire unit 2 opposite the light source 6.

The two light guiding surfaces 14-1 and 14-2 and the light introducing area 14-3 are transparent, as are the remaining regions of the optical waveguide plate 14. As a result, part of the light guided through the optical waveguide plate 14 can emerge through its two light guiding surfaces 14-1 and 14-2.

A first light reflecting area 16 of an opaque reflector 18 is arranged opposite the first light guiding surface 14-1, which is arranged at the top. This first light reflecting area 16 has a very large number of reflecting area regions 16-1 and 16-2. These regions extend obliquely with respect to one another and obliquely with respect to the first light guiding surface 14-1. They reflect light 8-2 emerging from the first light guiding surface 14-1 back through the light guiding surface 14-1 and into the optical waveguide plate 14. At least part of the reflected light 8-4, together with non-reflected light 8-3, emerges essentially without glare from the optical waveguide plate 14 through the second light guiding surface 14-2, pointing downward, into the room region 12 below.

At least some, and preferably about 50%, of the light guiding area regions 16-1 and 16-2 face toward the light source position 4, while the others face away from the light source position 4.

The reflecting area regions 16-1 which face toward the light source position 4 preferably extend at an angle α of between 20 degrees and 45 degrees relative to the upper light guiding surface 16-1 situated opposite, and preferably at an angle of approximately 30 degrees. The smaller is this angle α, the less glare is present in the reflected light emerging from the lower light guiding surface 14-2.

The reflecting area regions 16-2 facing away from the light source position 4 extend at an angle β of preferably between 45 and 75 degrees relative to the upper light guiding surface 14-1 situated opposite them, preferably at an angle of approximately 60 degrees.

Of course, embodiments are also possible in which the reflecting area regions 16-1 and 16-2 facing both toward the light source position and facing away from it extend at an identical angle obliquely with respect to the light guiding surface 14-1 situated opposite them, for example at an angle of 45 degrees.

In preferred embodiments of the invention, the reflecting area regions 16-1 and 16-2 are formed by the side areas of mutually parallel ribs 20. Each rib 20 preferably has a pointed form in the shape of a roof. The troughs formed between the ribs also have a pointed form in the shape of an inverted roof. However, other forms are also possible, e.g. an undulating form.

The ribs 20 are preferably integrally formed on the reflector 18, for example by a casting, compression molding or rolling method. The reflector 18 preferably comprises a metal plate, and preferably an aluminum plate. The reflecting area regions 16-1 and 16-2 may be coated, but are preferably comprised only of the material of the reflector 18, without a coating.

In preferred embodiments, about six to eight ribs 20 are formed per centimeter, as seen in rib cross section. In accordance with a preferred embodiment, seven ribs are provided per centimeter. However, provision of significantly more or significantly fewer ribs per centimeter is also possible.

Furthermore, embodiments according to the invention are also possible in which the reflecting area regions 16-1 and 16-2 are not arranged in parallel rows relative to one another but extend in other directions. This produces, for example, not ribs and troughs between ribs, but rather produces individual, for example pointed, material elevations and intervening material depressions which together form the first light reflecting area 16 of the reflector 18.

In the embodiment in FIG. 1, the first light reflecting area 16 bears on the first light guiding surface 14-1 with the elevated regions 22, which are formed between its reflecting area regions 16-1 and 16-2. In this case, the elevated regions 22 are the tips of the ribs 20, which are preferably sawtooth-shaped.

If it is desired for light from the light source 6 to also be reflected upward from the luminaire unit 2, then it is possible, as shown in FIG. 1, for a second light reflecting area 26 to be provided on that side of the reflector 18 which faces away from the first optical waveguide plate 14. That light reflecting area points in the direction away from the first optical waveguide plate 14 and lies in a light beam path 8-5 which is emitted by the light source 6 arranged in the light source position 4.

The second light reflecting area 26 can radiate light at a ceiling or at a wall. The light is reflected from there as "indirect" light into the room region 12 to be illuminated. The second light reflecting area 26 may be a smooth area or may be designed identically to the first light reflecting area 16. Again, a very large number of reflecting area regions 16-1 and 16-2 extending obliquely with respect to one another and obliquely with respect to the plane of the first optical waveguide plate 14 may be provided and arranged in the manner described above.

A second light guiding body may be arranged opposite the second light reflecting area 26, or opposite a light reflecting area that replaces the area 26 in the form of the first light reflecting area 16, or, alternatively, this is not effected. A second plate 28 may be arranged opposite it, which plate is comprised of transparent material. For example, it is a customary glass plate or plastic plate. It is preferably arranged in such a way that light beam path 8-5 from the light source 6 can penetrate its end 10 and radiate to the second light reflecting area 26 and from where it can be reflected through the second plate 28 and upward out of the luminaire unit 2, as is illustrated schematically e.g. by light beam path arrows 8-6 in FIG. 1.

The second plate 28 may be an optical waveguide plate like the first optical waveguide plate 14 or may be replaced by such an optical waveguide plate 14, which guides light 8-4 introduced through its light introducing area 14-3 or 28-3 at the end, through the second plate 28 between its lower third light guiding surface 28-1, facing toward the second light reflecting area 26, and its fourth light guiding surface 28-2, pointing upward. Like the first optical waveguide plate 14, the second optical waveguide plate 28 is designed such that light can emerge from it through its optical waveguide surfaces 28-1 and 28-2. As a result, light emerges from the upwardly pointing fourth light guiding surface 28-2 which is light 8-6 reflected from the second light reflecting area 26 and also light 8-7, which is reflected from the inner side of the downwardly pointing third optical waveguide surface 28-1 in such a way that it emerges from the upper optical waveguide surface 28-2.

The second light reflecting area 26 may be formed, e.g., by the rear side of the first reflector 18 or a second reflector 27 or by two first reflectors 18 which are arranged such that they face away from one another in a mirror-inverted manner. As a result, the respective first light reflecting area 16 is directed toward one of the two optical waveguide plates 14 or 28.

The end 10-2 which faces away from the light source position 4 is preferably closed off by a third reflector 38, having a light reflecting area 38-1 that points toward the first light reflecting plate 14 and the second plate 28.

Figure 2:
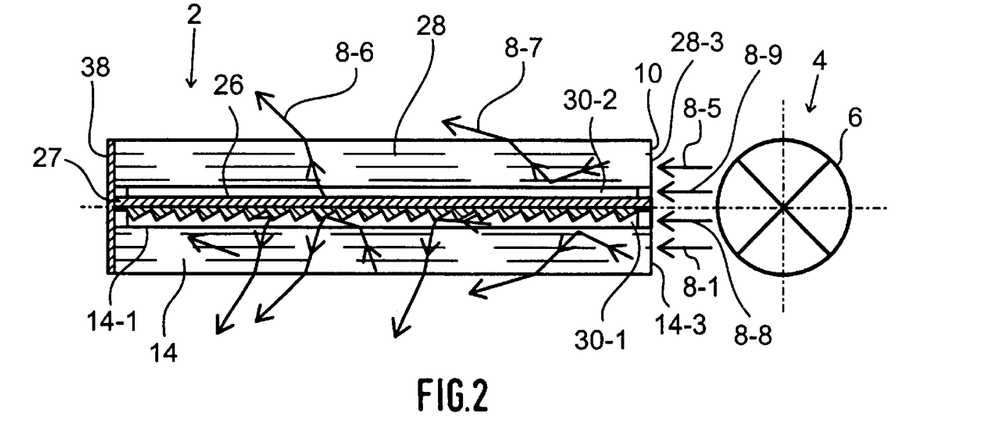

In FIG. 2, the first light reflecting area 16 and/or the second light reflecting area 26 may be spaced from the first light guiding surface 14-1 and/or 28-1 situated opposite it. As a result, a respective spacing gap 30-1 and/or 30-2 is formed between them and light from the light source 6 of the light source position 4 can enter the gap, as illustrated schematically by light beam arrows 8—8 and 8–9 in FIG. 2. This significantly increases the light intensity generated downward and upward from the luminaire unit 2.

Figure 3:
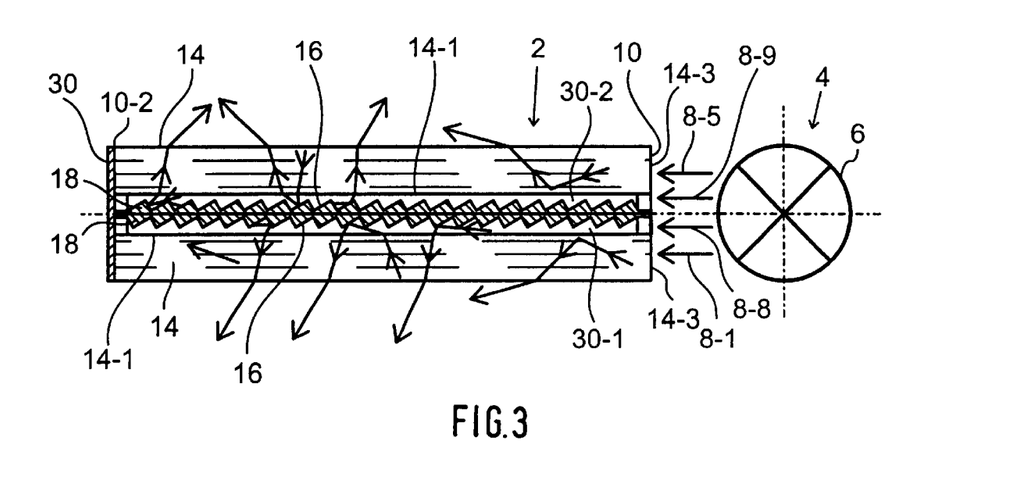
Figure 4:
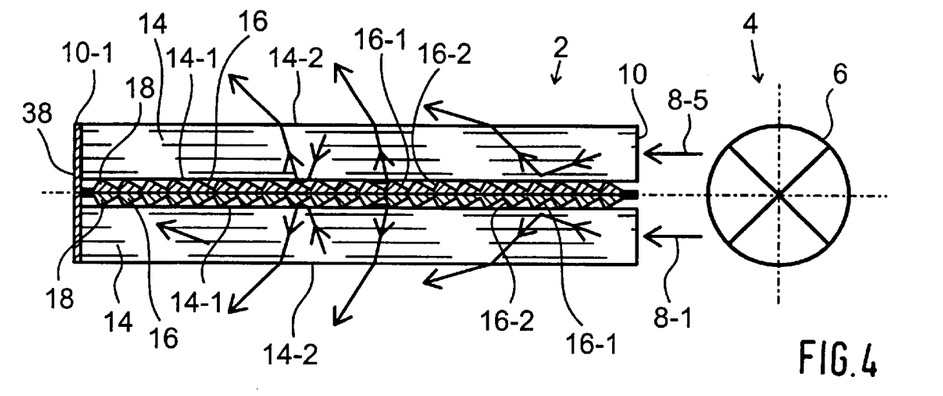

In the embodiments in FIGS. 3 and 4, there are two first optical waveguide plates 14. Between them, two first reflectors 18 are arranged opposite one another. The light reflecting areas 16 of the two reflectors 18 may have a spacing gap 30-1 and 30-2 from the first light guiding surface 14-1 situated opposite them, as shown in FIG. 3, or may bear on those surfaces without spacing, as shown in FIG. 4.

Figure 5:
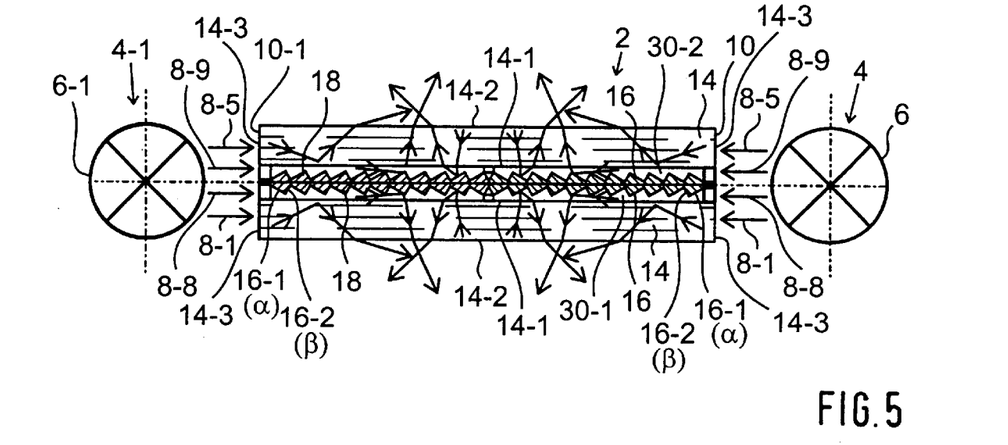

The embodiment of FIG. 5 shows a luminaire unit 2 similar to that in FIG. 3. But, it is transparent at both ends 10 and 10-1 and it has a respective light introducing area 14-3, which is respectively arranged opposite a light source 6 and 6-1 in a first light source position 4 and, respectively, in a second light source position 4-1. The two first reflectors 18 may comprise a single element, or an upper or a lower element or, as shown in FIG. 5, may comprise four elements arranged centrosymmetrically. In this case, the angles α and β, over half the length of the luminaire unit 2, are oriented to the right to the first light source position 4 and to the left to the second light source position 4-1. The tips 22 of the elevations or ribs 20 of the light reflecting regions 16-1 and 16-2 of the two first light reflecting areas 16 may bear on the optical waveguide plates 14 or, as shown in FIG. 5, may have a spacing gap 30-1 and 30-2 in between.

Figure 6:
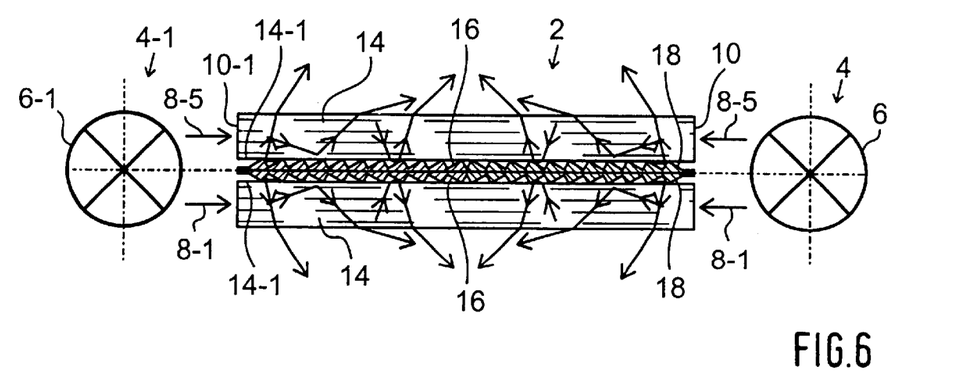

FIG. 6 shows an embodiment which corresponds to that in FIG. 5, but in which in each case the first light guiding surface 14-1 of the two optical waveguide plates 14 or only one of them bears on the light reflecting area 16, situated opposite it, of the first reflectors 18.

Figure 7:
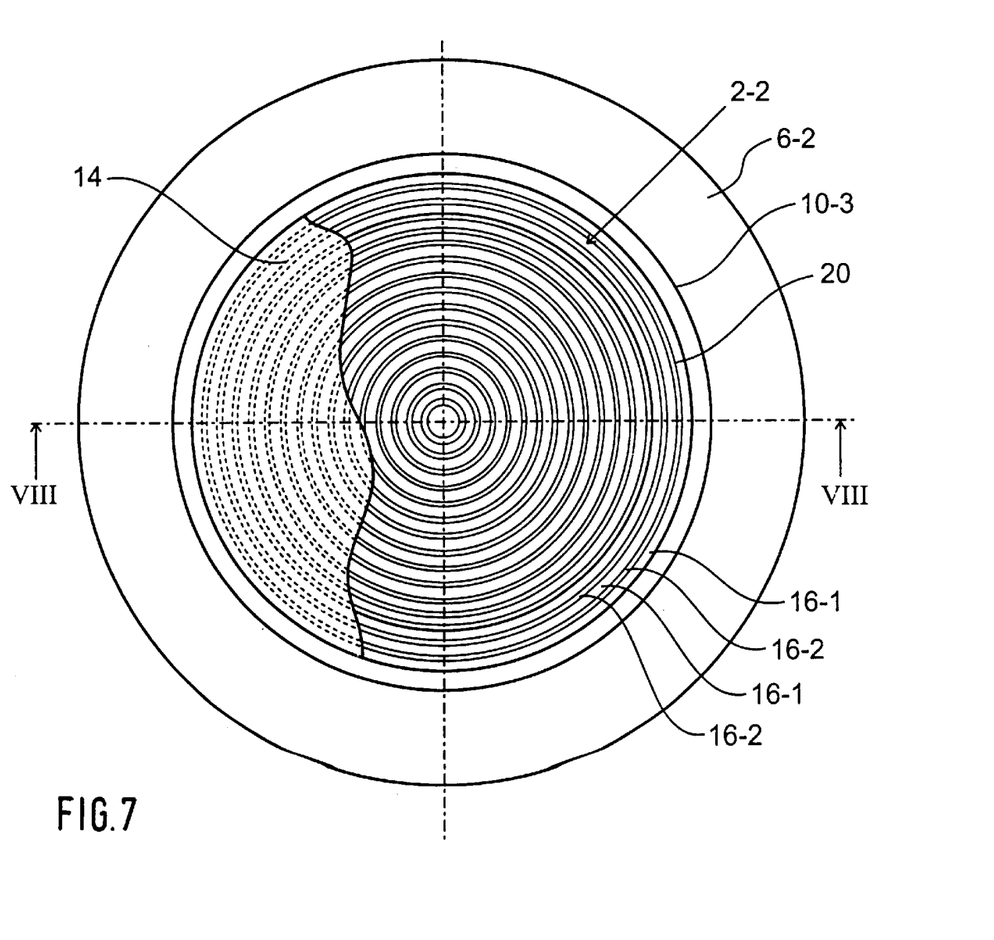
Figure 8:
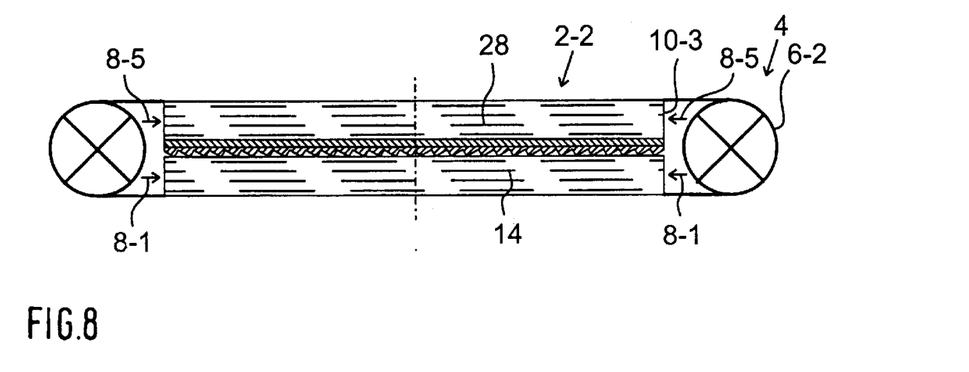
FIG. 8 shows a cross section along the plane VIII—VIII of FIG. 7.

FIGS. 7 and 8 show a circular-disk-shaped luminaire comprising a circular-disk-shaped luminaire unit 2—2 surrounded by an annular luminescent tube 6-2, whose light is coupled into the annular end 10-3 of the luminaire unit 2—2. This embodiment corresponds to that of FIG. 1, with the difference that in FIG. 7 the ribs 20 are arranged circularly. The ribs form the correspondingly circular reflecting area regions 16-1 and 16-2.

Figure 9:
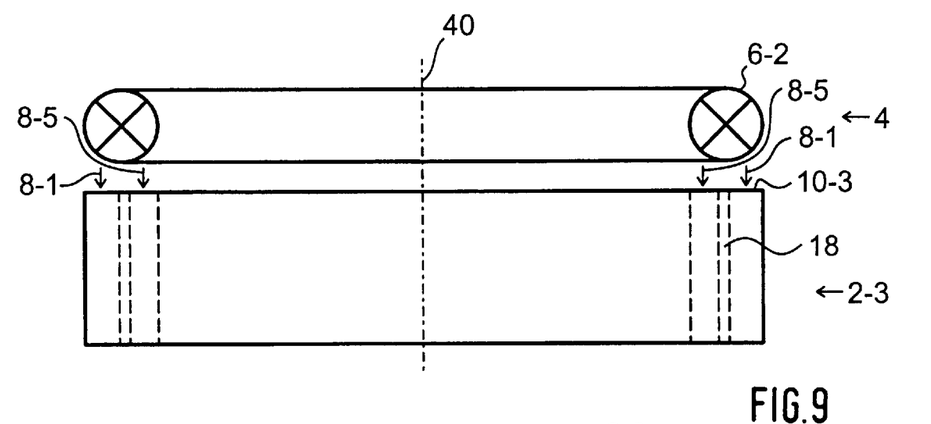
FIG. 9 shows a side view of a further embodiment of a luminaire according to the invention.
Figure 10:
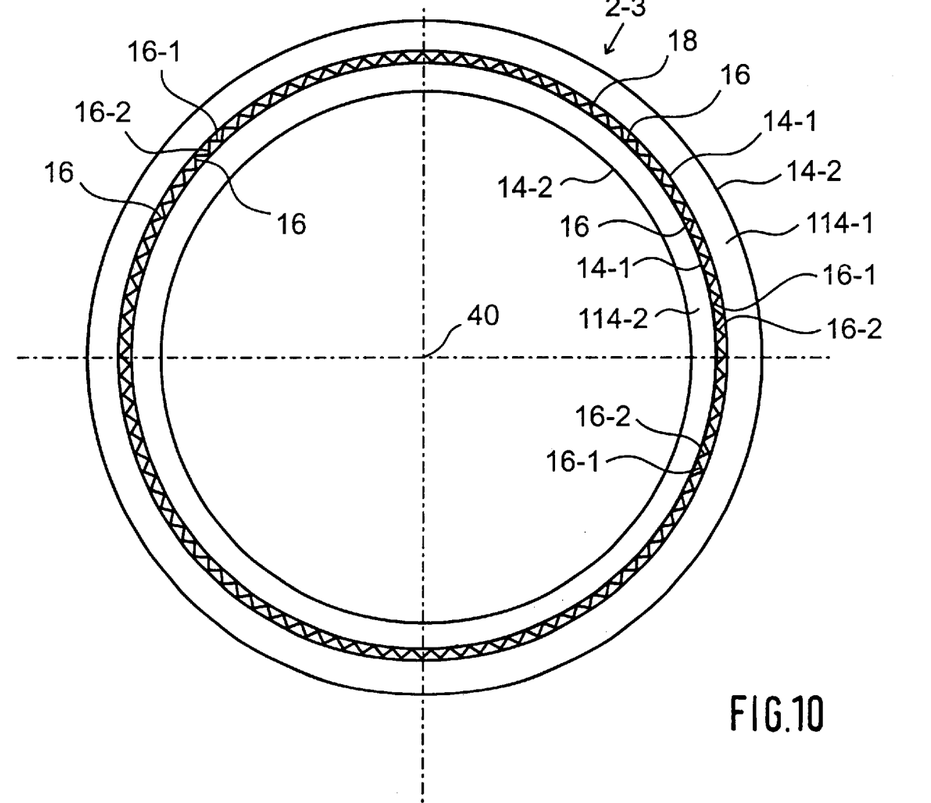
FIG. 10 shows a bottom view of the luminaire of FIG. 9, FIG. 11 schematically shows a side view of a further luminaire according to the invention, FIG. 12 schematically shows a plan view of yet another luminaire according to the invention.

In the embodiment according to FIGS. 9 and 10, two rings 114-1 and 114-2 are provided. At least one is comprised of transparent material and at least one comprises an optical waveguide, the circumferential areas forming first and second optical waveguide surfaces 14-1 and 14-2, respectively. Both rings are illustrated as optical waveguides in FIGS. 9 and 10. A reflector 18 is arranged between the two rings. The reflector has first light reflecting areas 16 both pointing radially outward and pointing radially inward as in FIG. 1. These have first and second light reflecting area regions 16-1 and 16-2 directed in the circumferential direction. These may be rib-shaped in a manner corresponding to the ribs 20 and run parallel to the ring axis 40, or may run obliquely with respect thereto or may combine a multiplicity of mutually oblique reflecting areas, so that continuous ribs and troughs are not formed. The annular fluorescent tube 6-2 is arranged opposite an end 10-3 of the annular luminaire unit 2–3.

Figure 11:
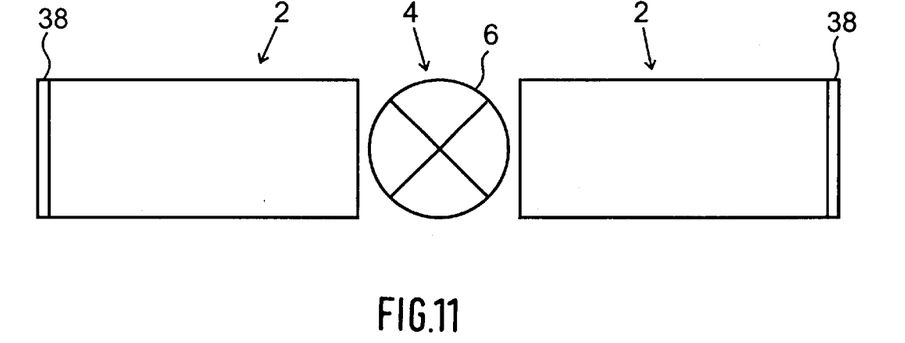

FIG. 11 schematically shows a side view of a luminaire having two luminaire units 2 according to one of FIGS. 1 to 6 but a single light source 6, radiating light into both luminaire units 2, at a light source position 4 arranged between them.

Figure 12:
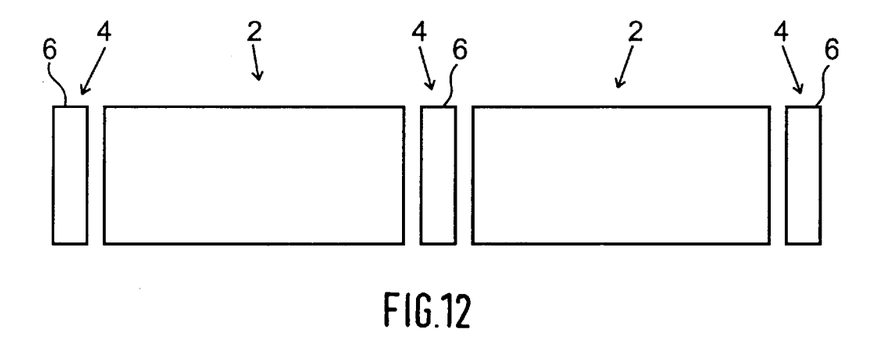

FIG. 12 schematically shows a luminaire having two luminaire units 2 according to one of FIGS. 1 to 6 with a light source 6 arranged between them and further light sources 6 arranged at their two outer sides, so that a total of three light source positions 4 are provided. The luminaire units 2 are each transparent at both ends 10 and 10-1, as shown in FIGS. 5 and 6 as examples.

Figure 13:
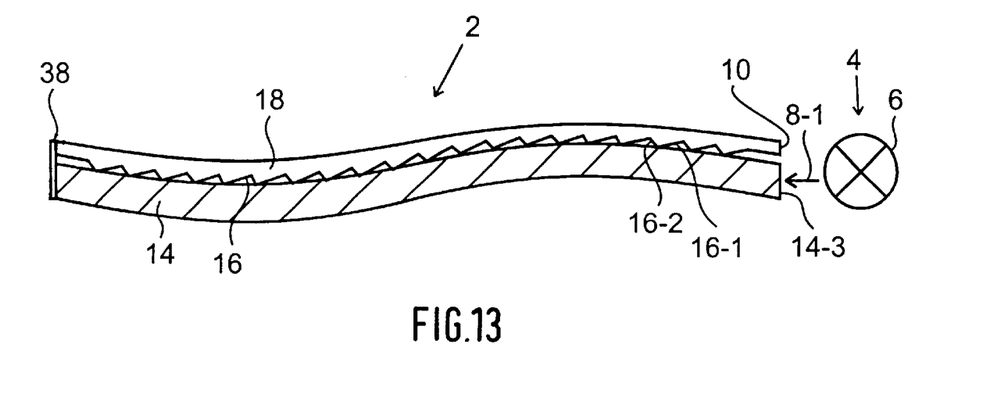
FIG. 13 shows a schematic side view of a further embodiment of a luminaire according to the invention.

FIG. 13 shows an embodiment similar to FIG. 1, but in an arcuate configuration rather than a planar one. Parts which correspond to parts of FIG. 1 are provided with the same reference numerals, so that reference is made to the description thereof.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A luminaire comprising:
   at least one first optical waveguide, the waveguide having a first and a second light guiding surface which face away from each other and which guide light through the optical waveguide;
   at least one light introducing area arranged transversely with respect to the light guiding surfaces for introduction of light from a light source position into the optical waveguide;
   the light guiding surfaces and the light introducing area being transparent;
   a first opaque light reflector arranged opposite the first light guiding surface, the first light reflector comprising a large number of reflecting regions which extend obliquely with respect to one another and obliquely with respect to the first light guiding surface for reflecting light emerging from the first light guiding surface back through the first light guiding surface and into the optical waveguide so that at least part of the reflected light, together with non-reflected light, emerges essentially without glare from the optical waveguide through the second light guiding surface.

2. The luminaire of claim 1, where at least some of the reflecting regions are faced generally toward the light source position.

3. The luminaire of claim 2, wherein the reflecting regions facing generally toward the light source position extend at an angle $\alpha$ of between 20 degrees and 45 degrees relative to the first light guiding surface.

4. The luminaire of claim 2, wherein the reflecting regions facing generally toward the light source position extend at an angle $\alpha$ of approximately thirty degrees relative to the first light guiding surface.

5. The luminaire of claim 2, wherein the reflecting regions comprise side areas of mutually parallel ribs extending across the first light guiding surface.

6. The luminaire of claim 1, wherein the reflecting regions are formed from metal plate.

7. The luminaire of claim 1, wherein the first light reflector is supported at a gap spacing from the first light guiding surface.

8. The luminaire of claim 7, wherein the light source position is located to provide a light beam path through the light introducing area of the first optical waveguide and a further light beam path into the gap spacing between the first light reflector and the first light guiding surface.

9. The luminaire of claim 1, wherein the first light reflector includes elevated regions which are formed between the reflecting regions; the elevated regions and the first light guiding surface being located so that the elevated regions bear on the first light guiding surface of the optical waveguide.

10. The luminaire of claim 2, wherein a second light reflector is provided on the side of the first light reflector which faces away from the first optical waveguide, pointing in the direction away from the first optical waveguide, and lying in a light beam path which proceeds from the light source position.

11. The luminaire of claim 10, wherein the second light reflector comprises an opaque reflector surface arranged opposite a third light guiding surface, the second light reflector comprising a large number of reflecting regions which extend obliquely with respect to one another and obliquely with respect to the third light guiding surface for reflecting light emerging from the third light guiding surface back through the third light guiding surface and into the optical waveguide so that at least part of the reflected light, together with non-reflected light, emerges essentially without glare from the optical waveguide through a surface thereof.

12. The luminaire of claim 10, further comprising a plate of transparent material arranged opposite the second light reflector, the plate being adapted to have light reflected through it from the second light reflector.

13. The luminaire of claim 12, wherein the transparent plate is supported with respect to the second light reflector to define a gap spacing between them.

14. The luminaire of claim 13, wherein the light source position and the gap spacing between the transparent plate and the second light reflector are so positioned that a light beam path extends from the light source position into the spacing region between the second light reflector and the transparent plate.

15. The luminaire of claim 12, wherein the transparent plate bears on the second light reflector.

16. The luminaire of claim 12, wherein the transparent plate comprises:

an optical waveguide having fifth and a sixth light guiding surfaces which face away from each other with the fifth light guiding surface facing toward the second light reflecting area; and     a second light introducing area situated opposite the light source position.

17. The luminaire of claim 16, further comprising a second light source position arranged on the side of the luminaire unit which faces away from the first light source position for introducing light into the arrangement from both the first and the second light source positions in mutually opposite directions to combine the light in the arrangement.

18. The luminaire of claim 1, further comprising a second light source position arranged on the side of the luminaire unit which faces away from the first light source position for introducing light into the arrangement from both the first and the second light source positions in mutually opposite directions to combine the light in the arrangement.

* * * * *